July 9, 1929.  T. N. DELIGIANES ET AL  1,719,833
NAPKIN FOLDING MACHINE
Filed March 18, 1925  9 Sheets-Sheet 6
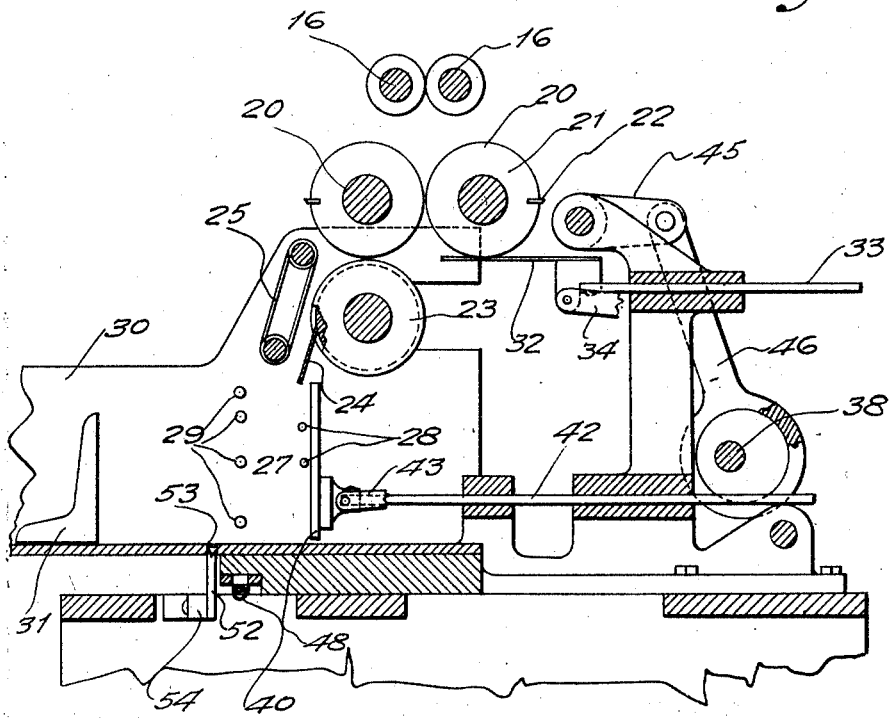
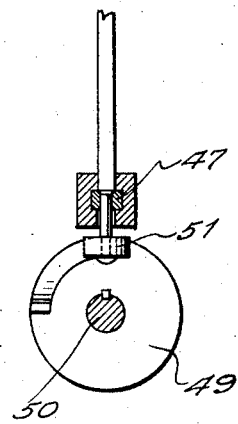
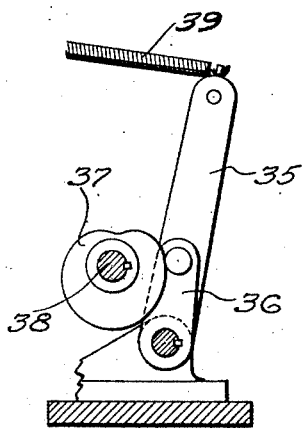
T. N. DELIGIANES
G. G. BOURDES
INVENTOR
BY Victor J. Evans
ATTORNEY July 9, 1929.   T. N. DELIGIANES ET AL   1,719,833
NAPKIN FOLDING MACHINE
Filed March 18, 1925    9 Sheets-Sheet 7

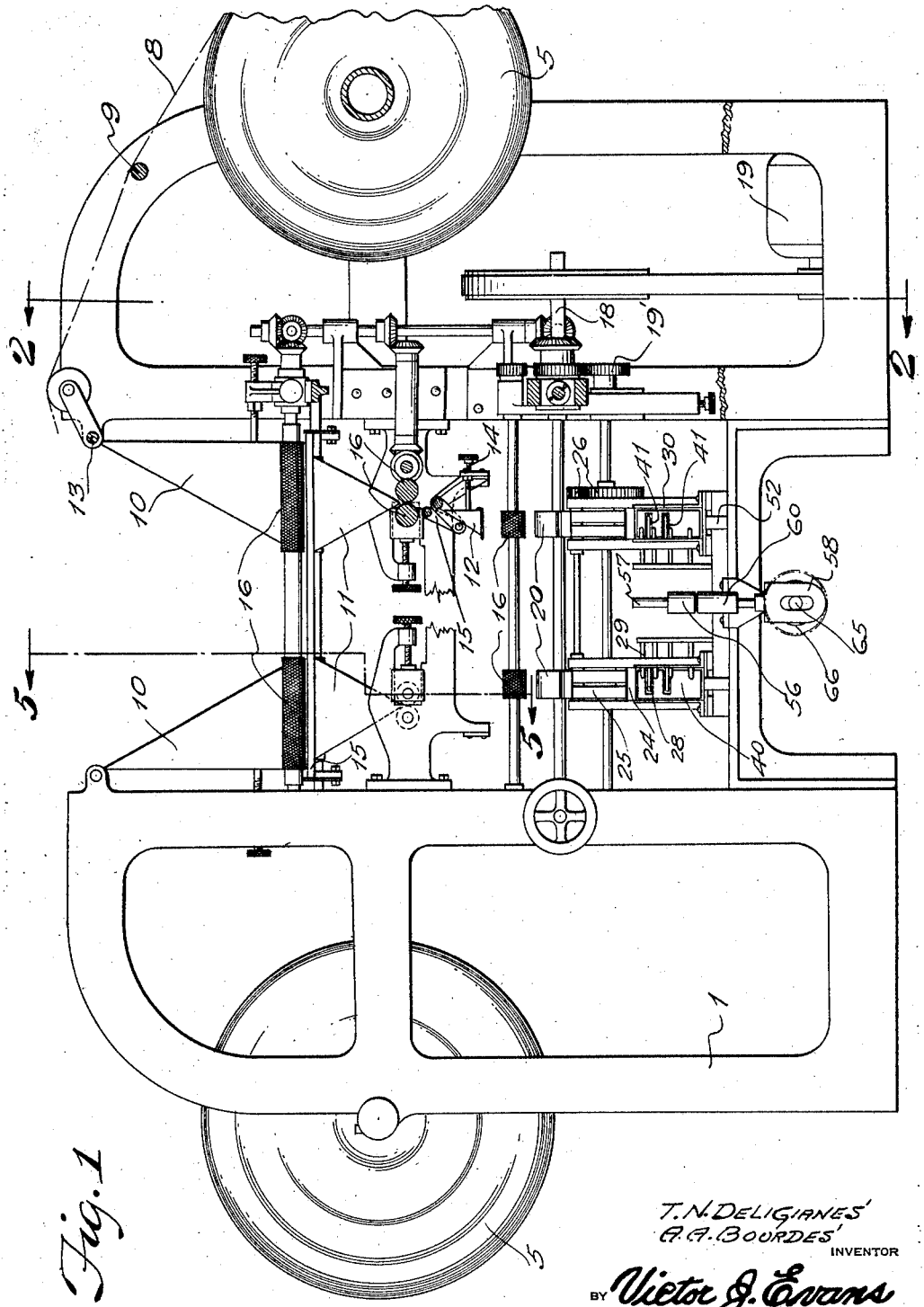

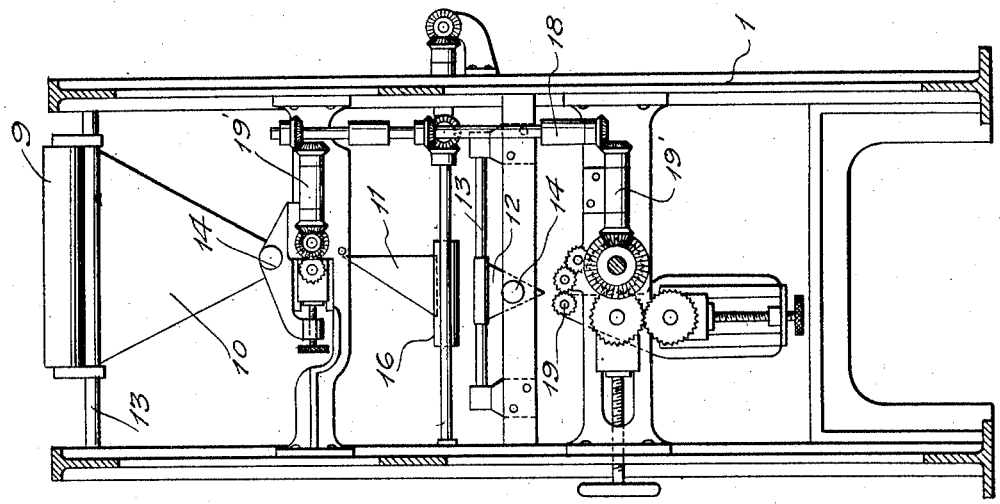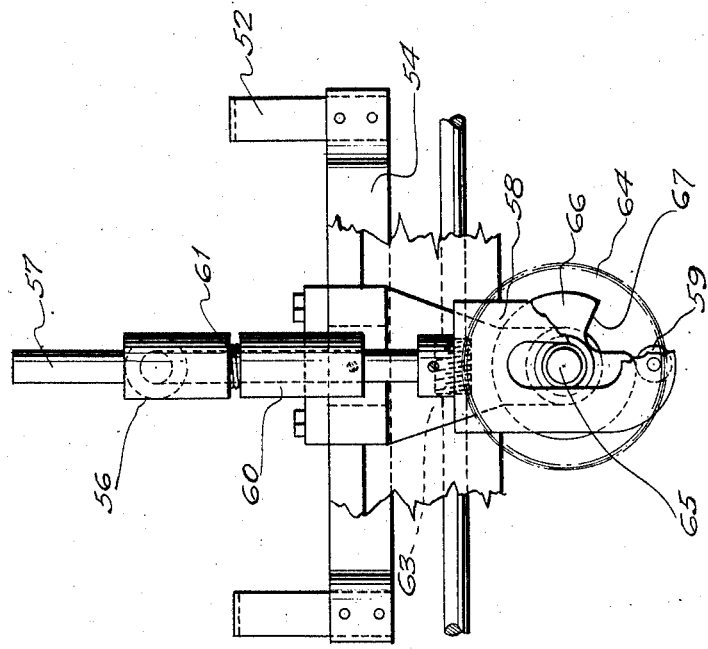

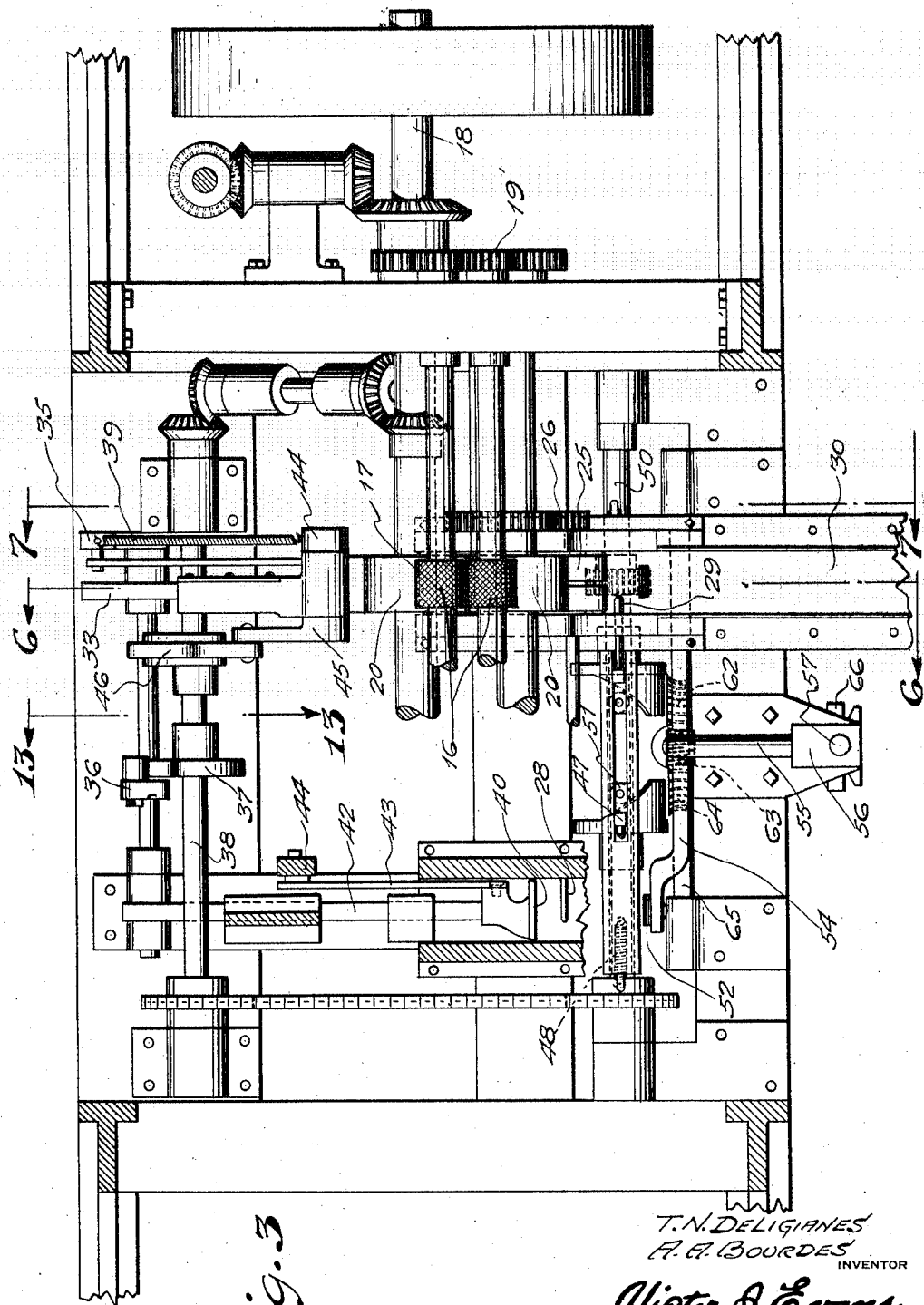

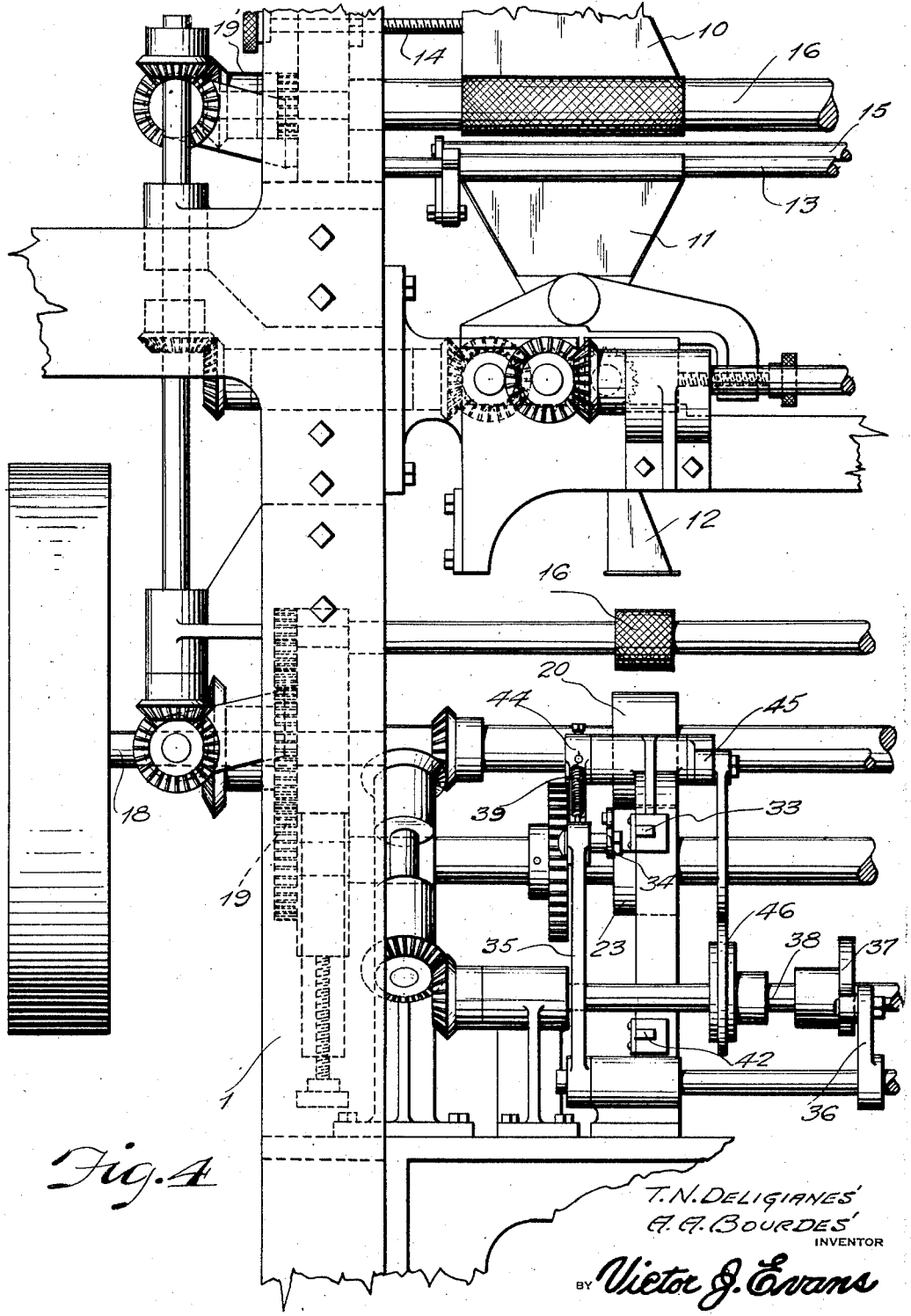

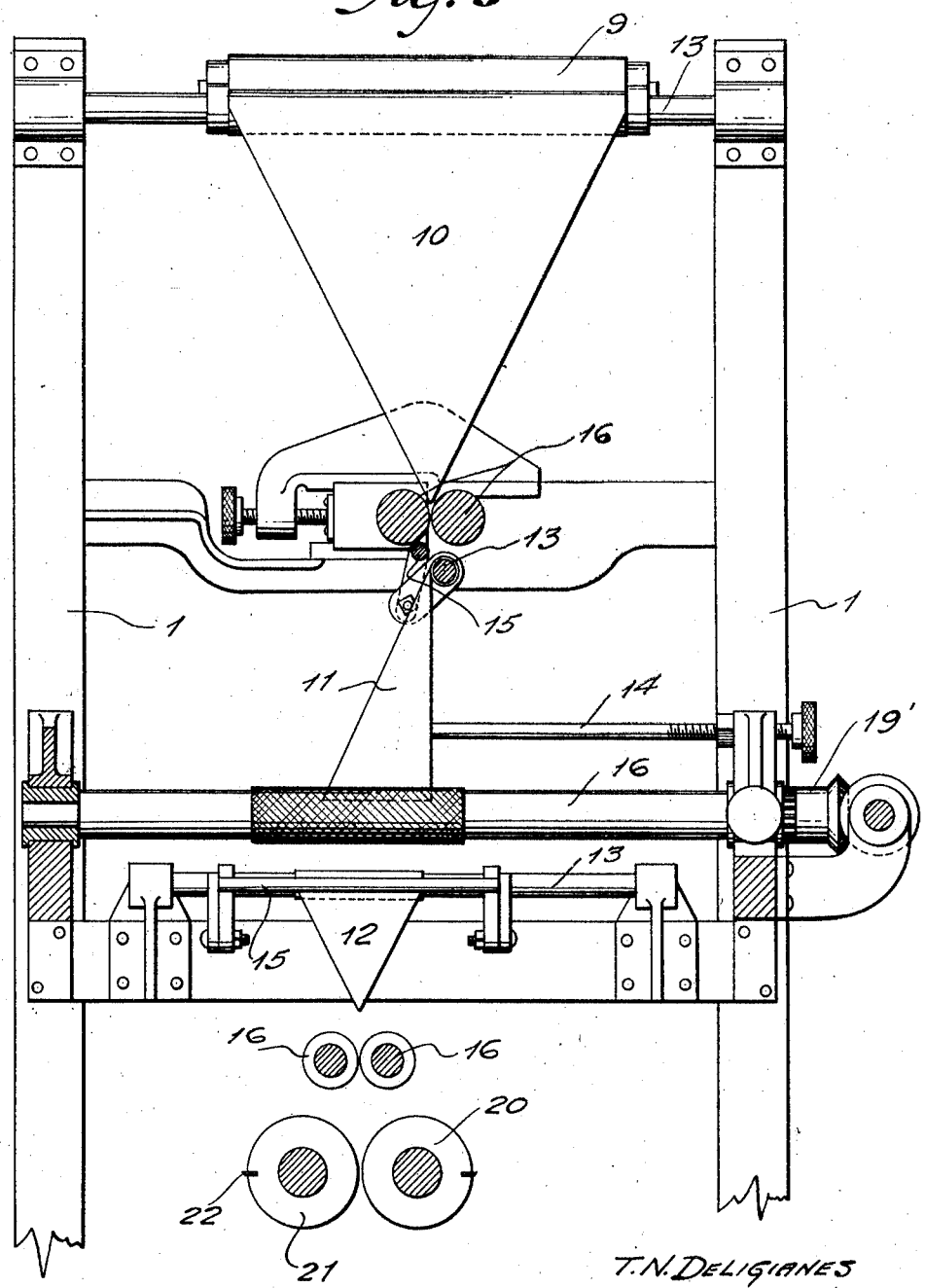

July 9, 1929.  T. N. DELIGIANES ET AL  1,719,833
NAPKIN FOLDING MACHINE
Filed March 18, 1925   9 Sheets-Sheet 8
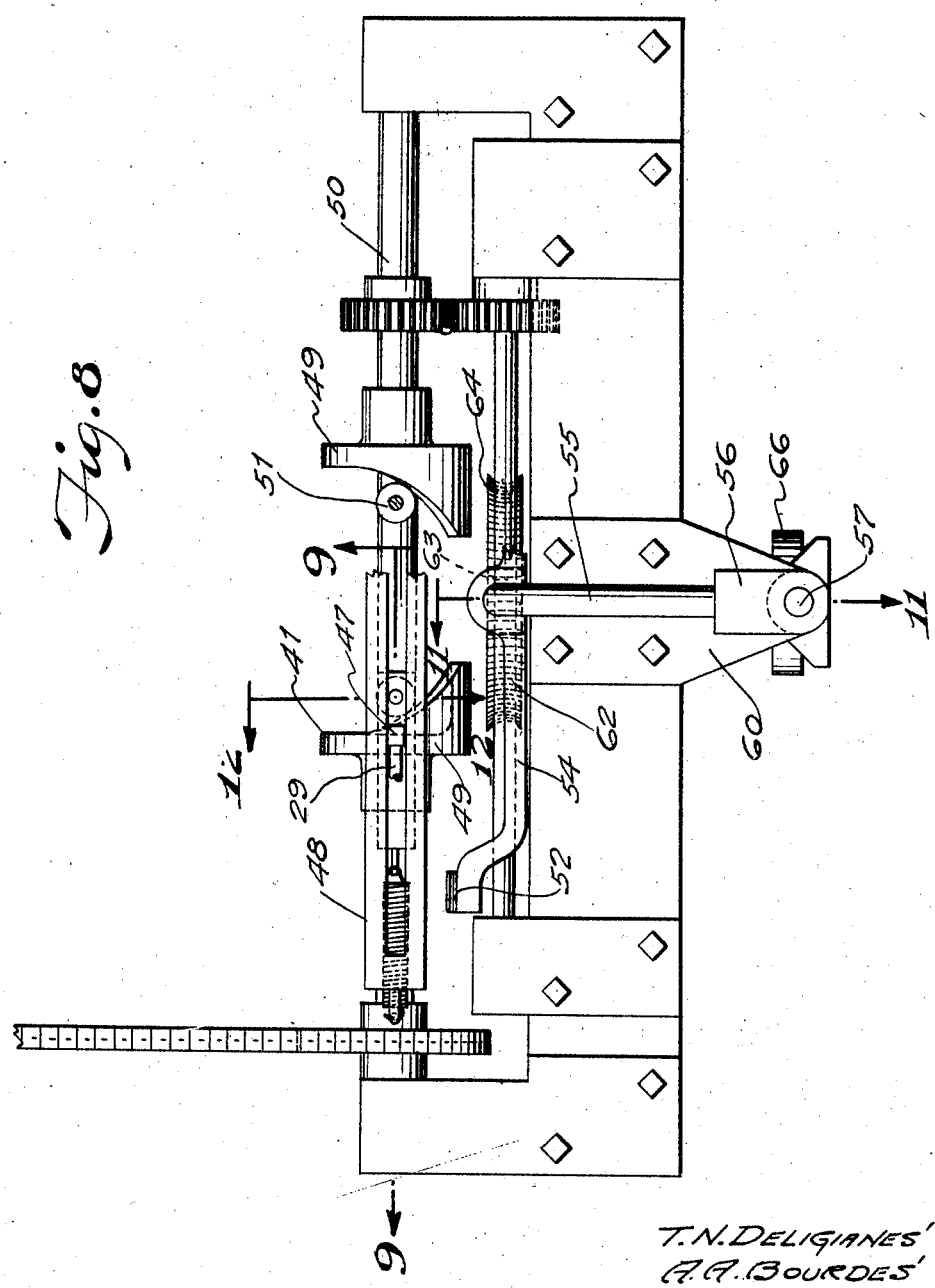

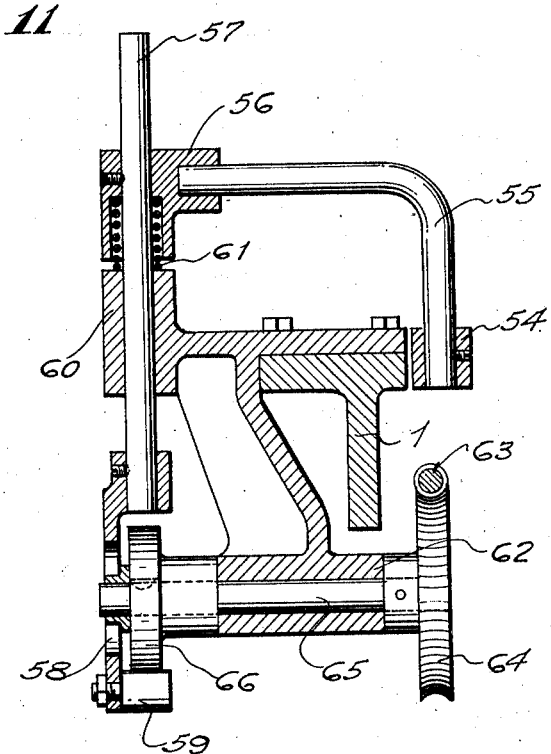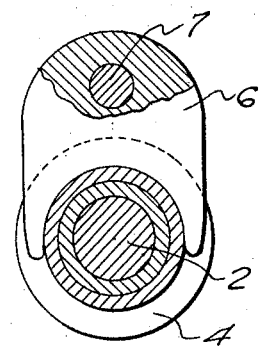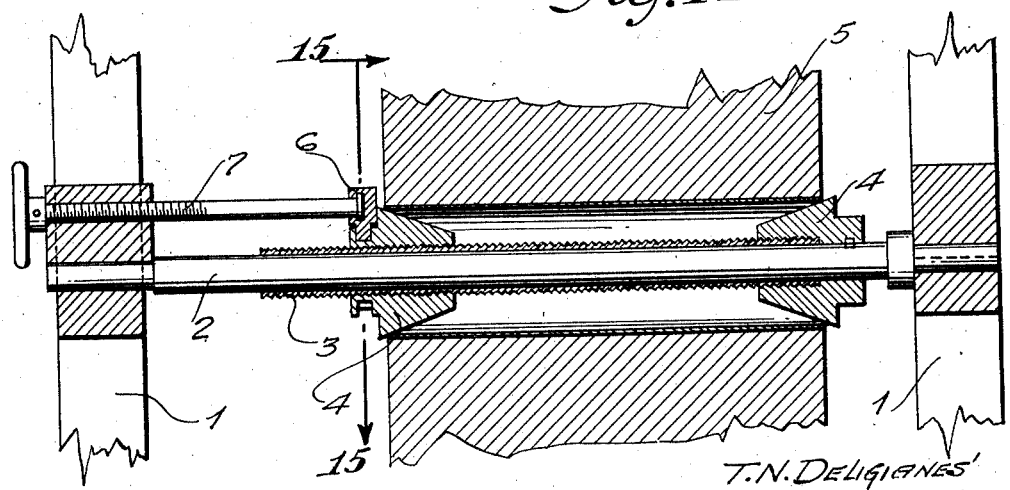

Patented July 9, 1929.

1,719,833

UNITED STATES PATENT OFFICE.

THOMAS N. DELIGIANES AND ANDREAS A. BOURDES, OF CHICAGO, ILLINOIS, ASSIGNORS, BY MESNE ASSIGNMENTS, TO GEORGE D. ANTHOULIS, OF GARY, INDIANA.

NAPKIN-FOLDING MACHINE.

Application filed March 18, 1925. Serial No. 16,483.

This invention relates to a napkin cutting and folding machine and has for its primary object the construction of a machine that will more rapidly and more accurately and more efficiently cut and fold napkins.

An object of the invention is the construction of a machine that besides accomplishing the foregoing results will separate, count and deliver the napkins from the machine ready for shipment.

An object of the invention is the novel manner of mounting for adjustment the main portions of the machine so that accuracy of feed of the paper is assured and any tendency to tear the paper eliminated.

Besides the above our invention is distinguished in the combination and arrangements of mechanism whereby the machine will have a smooth operation throughout and the jamming of the napkins positively prevented.

With these and other objects in view the invention will be better understood from the following description taken in connection with the accompanying drawings, in which:

Fig. 1 is a front elevation of the duplex machine constructed in accordance with our invention.

Fig. 2 is a sectional view on the line 2—2 of Fig. 1.

Fig. 3 is an enlarged horizontal sectional view.

Fig. 4 is an enlarged rear elevation.

Fig. 5 is an enlarged sectional view on the line 5—5 of Fig. 1.

Fig. 6 is a sectional view through the delivering mechanism on the line 6—6 of Fig. 3.

Fig. 8 is a top plan of the counting mechanism.

Fig. 10 is a front elevation of the counting mechanism.

Fig. 11 is a cross sectional view of the counting mechanism.

Fig. 12 is a detailed view of a portion of the discharging mechanism.

Fig. 13 is a detailed view of one of the cam devices of the delivering mechanism.

Fig. 14 is a sectional view through the paper roll support.

Fig. 15 is a sectional view on the line 15—15 of Fig. 14.

Figure 7:
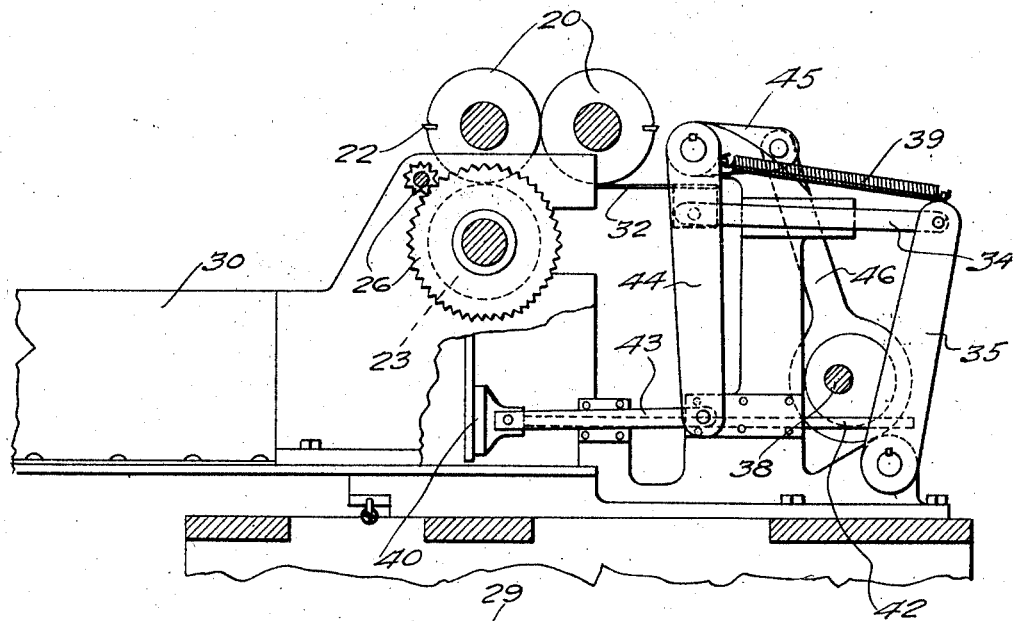
Fig. 7 is a sectional view on the line 7—7 of Fig. 3.

Again referring to the drawings illustrating one of the many constructions of our invention, the numeral 1 designates the frame of the duplex construction as shown in the drawings. The following description will be limited to one mechanism although it is wished to be understood that any number of mechanisms may be connected up in series. The frame 1 supports a stationary shaft 2 upon which is mounted a threaded sleeve 3 that is free to rotate upon the shaft. This sleeve has a screw threaded thereto and bearings 4 for receiving the roll of paper 5. One of the bearings is connected to a sliding collar 6 that is operated by the adjusting screw 7. Thus it will be seen that the position of the roller on the shaft may be changed at will to assure accurate alignment of the roll of paper with the other mechanism to be described later. The strip of paper 8 is fed over an idler 9 and then over a series of fold forming plates hereinafter known as the advance plate 10, intermediate plate 11, and the final plate 12. These plates are so shaped and arranged as to give a plurality of folds to the paper strip so that when the strip is finally forced from the cutting rolls the napkin will have a sixteen fold. Each of the plates is fixed to a pivot rod 13 so that the angular position thereof may be changed at will by the feed screw 14. Thus it will be seen that accurate positioning of the plates will be assured for assuring accurate feed of the paper strip. Associated with the plates are a plurality of tensioning devices 15 for the purpose of holding the paper strip snugly associated with the plate. Also associated with the plates are pairs of feed rollers 16 having a roughened surface as indicated at 17. The main drive mechanism 18 receiving power from the motor 19 is connected by individual drive connections 19' with the feed rollers so that all the feed rollers will be driven in unison and the paper strip subject to a uniform pull.

Associated with the last set of feed rollers is a pair of rotary cutters 20 each consisting of a cylinder 21 in which is embedded a blade 22. The blades are so positioned relative to each other that they will subject the strip of paper passing therebetween to a shearing action. As the strip of paper is being cut and fed from the cutters the same is forced forwardly into engagement with the advancing roll 23 in a manner hereinafter described. This advancing roll 23 is associated with a chute 24 and a feed belt 25 which is driven at a rapid rate of speed by the gear connection 26. The feed belts drop the folded napkin into a pocket 27 formed between the stationary stops 28 and movable stops 29. These stops are mounted at the forward end of the trough 30 in which is slidably mounted the weighted rest 31.

We will now describe our improved napkin advancing mechanism, delivering mechanism, and stacking mechanism. The advance mechanism comprises a plunger or plate 32 operating to force the napkins from the cutters into engagement with the roller 23. This plunger includes a guide 33 and an operating link or bar 34 that is pivotly connected to a crank arm 35. This crank arm 35 is associated with another crank 36 operated by the cam 37 on the drive shaft 38. A spring 39 returns the crank 35 and associated parts to normal position. Thus it will be seen that the plunger 32 has a reciprocatory movement for intermittently forcing the napkins as cut from the cutters onto the advancing rolls.

Figure 9:
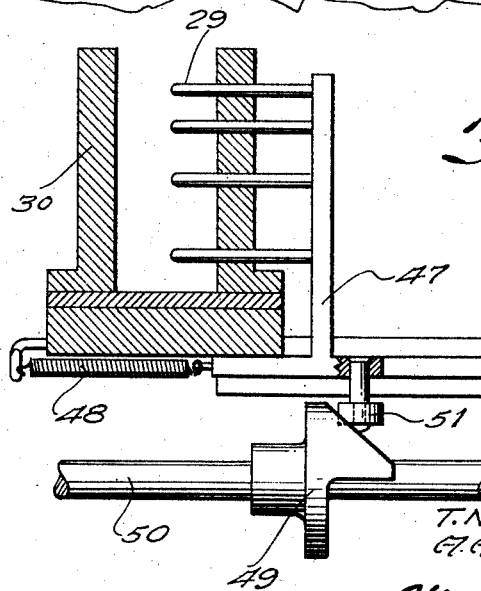
Fig. 9 is a sectional view through the trough and associate mechanism.

The delivering mechanism comprises a slide 40 moving in the trough and provided with slots 41 to enable the slide to pass by both sets of stops. This slide includes a guide or stem 42 and a link 43 which is connected to the crank 44 associated with a second crank 45 that has an eccentric connection 46 with the drive shaft 38. Thus it will be seen that the slide is reciprocated back and forth relative to the stops so as to force the napkins along the trough and as the napkins are supported by the rest it will be seen that they will be properly stacked. It will be seen that it is necessary that the movable stops 29 be removed from the interior of the trough in the advancing of the napkin and by referring to Figures 8 and 9 it will be seen that the stops are carried by the slide 47 and forced into an operative position by the spring 48. The cam 49 on the shaft 50 operates against the roller 51 carried by the slide to force the stops to an inoperative position and these parts are so arranged and timed that the stops are forced to an inoperative position when the napkin is being advanced by the slide but will return to operative position in the return movement of the slide to prevent the returning of the napkin into the pocket 27.

We have shown associated with the trough counting mechanism consisting of a plunger 52 arranged to pass through a slot 53 in the trough to engage between the stack of napkins. This plunger is carried by a bar 54 which is in turn secured to an arm 55 attached to a clamp 56. This clamp 56 engages the stem 57 but carries at its lower end a slotted plate 58 supporting a roller 59. The stem is slidably mounted in a bracket 60 and is urged upwardly by a spring 61.

The drive mechanism 62 includes the worm 63 and worm wheel 64. The worm wheel 64 is mounted on a shaft 65 carrying a disk 66 and is provided with a slot 67 arranged to register with the roller 59 when a certain number of napkins has been fed forwardly. When the slot registers with the roller it will be seen that the spring 61 is free to operate for instantly forcing the mechanism upwardly with the plunger engaging between the stack of napkins thereby separating the stack into batches of a predetermined number.

In the operation of the machine a roll of paper is placed upon the bearings 4 and the feed screw 7 adjusted for accurately positioning the roller so that the strip of paper will accurately feed over the idler and over the folding plates. The plates as well as the rollers are then accurately adjusted to assure accurate travel of the paper and besides reduces the resistance to which the paper is subject. As the papers are fed over the plates and between the feed rollers the napkin is accurately folded so that when the folded strip is cut by the rotary cutters and then advanced to the advancing roll, the napkin will have a sixteen fold. As the cut strip of paper is passing from the cutters the plunger 32 comes into action for forcing the same into engagement with the feed belts 25 which draw the napkin from the roll 23 and deposit the same within the pocket 27. When a napkin has been deposited within the pocket 27 the slide 40, through its connections, moves forwardly and as this action takes place the cam 49 redirects the movable stops 29 for allowing free travel of the napkin into stacking engagement with the rest or against the other napkins within the trough. In the return movement of the slide the cam 49 has advanced to a position to allow the spring 48 to return the stops into the trough to prevent return movement of the napkin into the pocket, the return movement of the slide being accommodated by the slots in the slide.

After a predetermined number of napkins has been forced into the trough the worm 63 has advanced the worm wheel 64 a required movement to bring the slot in the disk into registration with the roller 59 for allowing the spring 61 to instantly force the parts upwardly and the plunger 52 into engagement between the napkins.

It is, of course, to be understood that various parts of the mechanism may be designed in various ways and the parts may be associated in other combinations and therefore we do not desire to be limited in any manner except as set forth in the claims hereunto appended.

Having thus described our invention, what we claim is:

1. In a machine of the character stated, a pair of cutting rolls disposed to receive between them a continuous strip of material and to cut it into predetermined lengths, a folding roll adjacent one of the cutting rolls, and a feed plate operating between said folding roll and the cutting roll cooperating therewith and movable toward and away from the same, said plate engaging the severed lengths of material intermediate the ends thereof as they are discharged from the cutting rolls and feeding them between said folding roll and its cooperating cutting roll, the folding roll and the cutting roll cooperating therewith coacting to fold said severed lengths of material.

2. In a machine of the character stated, a pair of cutting rolls disposed to feed a strip of material downwardly between them and to cut the strip into predetermined lengths, a folding roll disposed below and adjacent one of the cutting rolls in parallel relation thereto, a feed plate below the cutting rolls and movable toward and away from the folding roll and between said folding roll and the cutting roll adjacent thereto, and means for operating said feed plate and causing it to engage with the severed lengths of material as they are discharged from the cutting rolls and feed them between the folding roll and its associated cutting roll.

3. In a machine of the character stated, a pair of cutting rolls disposed to feed a strip of material downwardly between them and to cut the strip into predetermined lengths, a folding roll disposed below and adjacent one of the cutting rolls in parallel relation thereto, a feed bar below the cutting rolls and movable toward and away from the same, a trough below the folding roll, a feed plate actuated by the bar and acting to initially fold the severed lengths of material as they are discharged from the cutting rolls and to feed them between the folding roll and its adjacent cutting roll, a driven endless belt cooperating with the folding roll for discharging the folded lengths of material from between said folding roll and its associated cutting roll, and means cooperating with the belt for delivering the folded lengths of material into the trough.

4. In a machine of the character stated, means for feeding a strip of paper and for folding it successively longitudinally, means for cutting the folded strips into sections of predetermined length, means cooperating with the cutting means for folding the cut lengths transversely, and means cooperating with the folding means for delivering therefrom the folded lengths of material.

5. In a machine for the purpose described, a rotatable advancing member, a rotatable cutting element arranged tangentially with respect to said member, a rotatable cutting element arranged tangentially with respect to said first mentioned cutting element, said cutting elements being disposed to receive between them a continuous strip of material and to cut said strip into predetermined lengths, and means for folding said predetermined lengths of said strip and for moving said predetermined lengths in a direction during folding action between said advancing member and said first mentioned cutting element.

6. In a machine for the purpose described, a rotatable advancing member, a rotatable cutting element arranged tangentially with respect to said member, a rotatable cutting element arranged tangentially with respect to said first mentioned cutting element, said cutting elements being disposed to receive between them a continuous strip of material and to cut said strip into predetermined lengths, means for folding said predetermined lengths of said strip and for moving said predetermined lengths in a direction during folding action between said advancing member and said first mentioned cutting element, a trough, and rotatable means arranged tangentially with respect to the advancing member and cooperating with the advancing member for delivering the predetermined length of said strip in folded form from said advancing roller and said first mentioned cutting element.

7. In a machine for the purpose described, a cutting mechanism for cutting a continuous strip of material into predetermined lengths, folding means operable on the predetermined lengths for folding each length upon itself, and a member cooperating with an element of said cutting mechanism for receiving the folded lengths from said cutting mechanism.

8. In a machine of the character stated, a pair of cutting rollers adapted to be disposed in horizontal alignment, co-operating cutting elements arranged on the periphery of said cutting rollers adapted to sever a continuous strip of material fed therebetween into predetermined lengths, a folding roller disposed below one of said cutting rollers and adapted to co-operate therewith whereby to fold severed lengths of material fed therebetween, and means for delivering said folded portions including an endless belt arrangement adapted to be disposed such that the receiving portion thereof is arranged in alignment with the engaging periphery of said folding roller with said cutting roller whereby said folded section of material delivered from between said rollers may be moved to a delivery point.

In testimony whereof we affix our signatures

THOMAS N. DELIGIANES.
ANDREAS A. BOURDES.